March 24, 1925.

W. J. KUHLS

CLUTCH

Filed Sept. 23, 1920

1,530,776

2 Sheets-Sheet 1

INVENTOR,
William J. Kuhls,
BY
Howard S. Smith,
ATTORNEY

March 24, 1925.

W. J. KUHLS

CLUTCH

Filed Sept. 23, 1920    2 Sheets-Sheet 2

1,530,776

INVENTOR
William J. Kuhls
BY
Howard L. Smm
His ATTORNEY

Patented Mar. 24, 1925.

1,530,776

UNITED STATES PATENT OFFICE.

WILLIAM J. KUHLS, OF MONTGOMERY COUNTY, NEAR DAYTON, OHIO.

CLUTCH.

Application filed September 23, 1920. Serial No. 412,149.

*To all whom it may concern:*

Be it known that I, WILLIAM J. KUHLS, a citizen of the United States, residing in the county of Montgomery, near the city of Dayton, and State of Ohio, have invented certain new and useful Improvements in Clutches, of which the following is a specification.

One of the principal objects of my invention is to provide a simple, efficient and easily-operated clutch mechanism to connect the driving and driven members of an automobile or any other type of structure or machine.

It is another object of my invention to provide friction means that are in themselves clutch elements which efficiently cooperate with the main clutch members in attaining the desired results.

Other important and incidental objects of my invention will be brought out in the following specification and particularly set forth in the subjoined claims.

Figure 1:
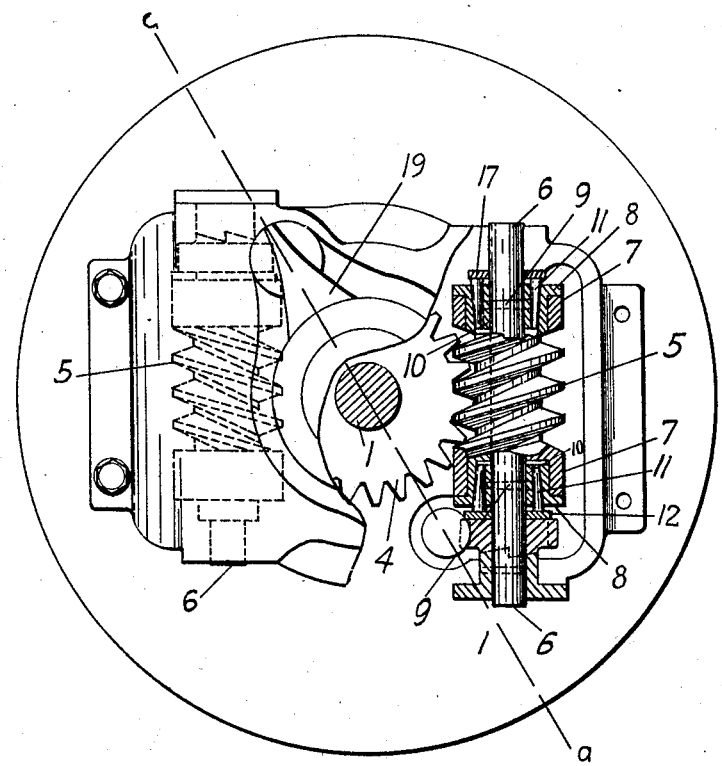
Figure 2:
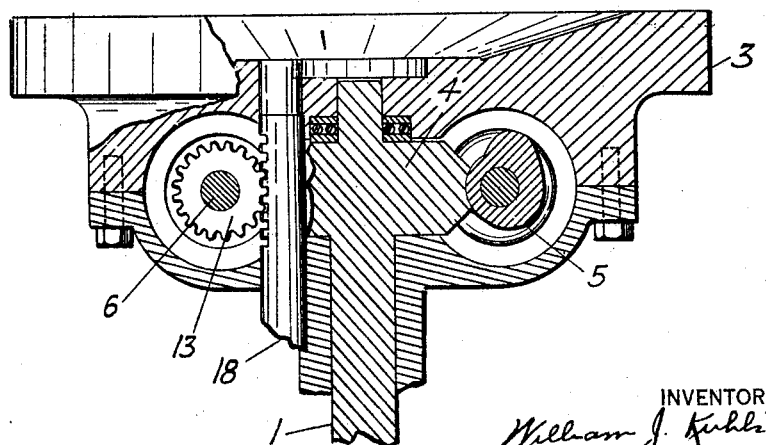
Figure 3:
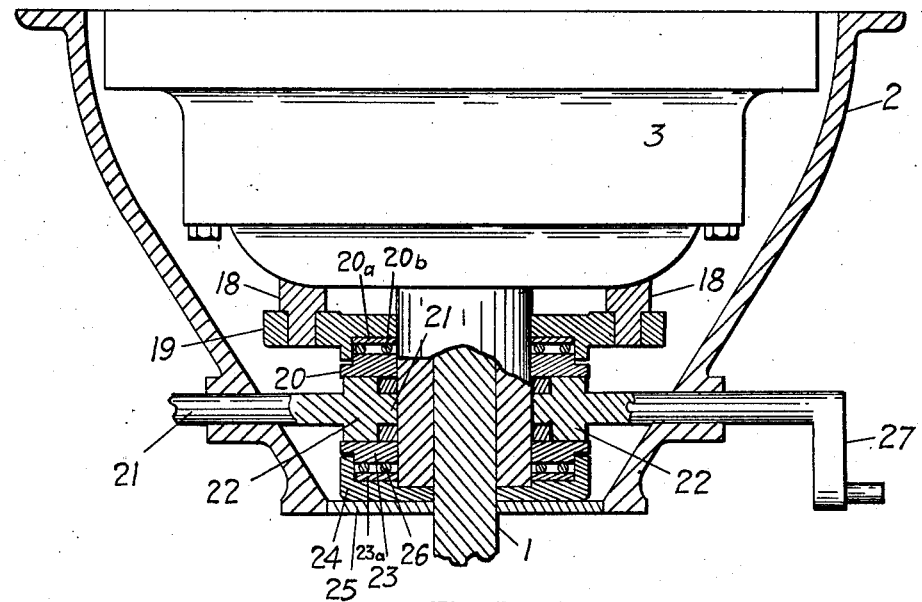
Figures 4, 5:
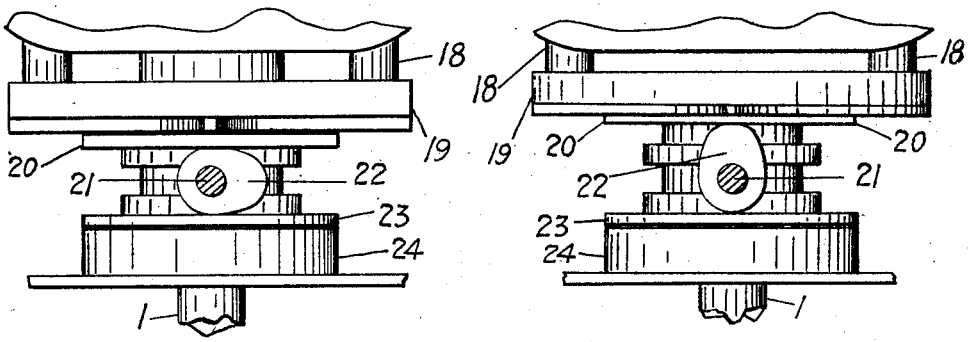
Figure 6:
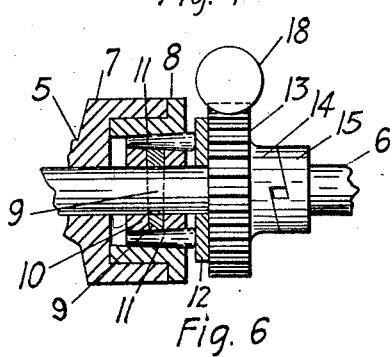
Figure 7:
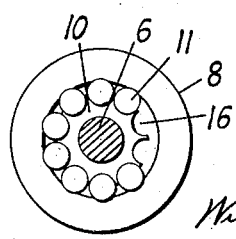

In the accompanying drawings, Figure 1 is an end elevational view, partly in section, of my clutch mechanism. Figure 2 is a plan view, partly in section, of the same. Figure 3 is a sectional view taken through the device on the line a—a of Figure 1. Figure 4 is a side elevational view of the cam-operated shifting means. Figure 5 is a similar view, showing the cam in its raised position. Figure 6 is a side elevational view, partly in section, of the tapered roller mechanism. And Figure 7 is an end view thereof.

Throughout the specification and drawings, similar reference characters denote corresponding parts.

In the accompanying drawings, the nuemarl 1 designates a driven shaft suitably journaled in a housing 2 and projecting into a gear casing 3 revoluble within said housing. Provided on the shaft 1 near its inner end is a gear 4 that is in mesh with two worms 5, 5, one on each side of said gear and loosely mounted on shafts 6, 6 fixedly secured in the casing 3 at right angles to the shaft 1. When the casing 3 revolves around the shaft 1, it carries with it the worms 5, 5 that are in mesh with the gear 1. Being in engagement with the teeth of the latter, the worms 5, 5 turn idly on their shafts 6, 6 until it is desired that the shaft 1 be rotated by the revoluble casing 3. In the latter instance, the worms 5, 5 are held in a stationary position on their shafts 6, 6 by mechanism now to be described.

Each of the worms 5, 5 has cupped ends 7, 7 into each one of which is pressed a bushing 8 having an inwardly tapered inner surface. (See Figures 1 and 6.) Secured by a pin 9 to the shaft 6 within the bushing 8, is a sleeve 10 whose outer periphery is so tapered as to form between it and the inner wall of the bushing, an inwardly tapering annular space adapted to receive a series of tapered rollers 11. The outer ends of the latter project beyond the bushing 8, to be engaged by a disc plate 12 secured to the rear face of a gear 13 slidable along the shaft 6. Secured to the front face of the gear 13 is a ratchet clutch member 14 adapted to be engaged by a similar clutch member 15 fast on the shaft 6.

When the gear 13 is rotated by the means soon to be described, it will be moved inwardly by the beveled edge portion of the stationary clutch member 15, to press the tapered rollers 11 tightly into the annular space between the sleeve 10 and the bushing 8. These tapered rollers rest in concave recesses or grooves 16 provided in the periphery of the sleeve 10. This increases the frictional contact between the rollers and the sleeves when the rollers are forced inwardly. In addition to their contact with the inner surface of the bushing 8, and the recessed portions of the sleeve 10, the rollers 11 engage each other when they are forced inwardly by the disc plate 12. It will therefore be seen that when these rollers are given an end thrust, they will form such a tight wedge between the bushing and sleeve, as to stop the rotation of the worms 5, 5 on the shafts 6, 6 when the casing 3 is revolved. When the rotation of these worms is stopped, the gear 4 will be rotated by them, to turn the shaft 1 on which it is fast, when the casing carrying said worms is further revolved. (See Figures 1, 6 and 7.)

When the front rollers 11 are pressed into the front cupped ends of the worms 5, 5, the rear cupped portions of the latter will be pressed over their rollers 11 whose rearward movement is limited by a plate 17 secured to that portion of the casing 3 that surrounds the rear end of a respective shaft 6. Like their front cupped ends, the rear cupped ends of said worms contain bushings 8 and sleeves 10 between which the rear rollers 11 are wedged when the front rollers are thrust inwardly.

For the purpose of rotating the gear 13 sufficiently to press the rollers 11 tightly between their respective bushings 8 and sleeves 10, the following construction is provided. Referring to Figures 2, 3, 4 and 5, each gear 13 is engaged by the teeth on a rack bar 18. These rack bars terminate at their front ends in reduced portions which are received by holes in a transverse member 19. Into the cupped central portion of the latter projects the tongue portion of an annular member 20 between which, and a plate 20$^a$ secured within the recessed portion of the transverse member 19, thrust bearings 20$^b$ are preferably disposed. (See Figure 3.)

Journaled in the housing 2 is a transverse shaft 21 upon the middle portion of which two oval disc cams 22, 22 are fast. These cams are in contact with the member 20, and an annular member 23 between which and a plate 23$^a$ within the recessed portion of a member 24 bearing against the end wall 25 of the housing 2, ball thrust bearings 26 are disposed. When the shaft 21 is turned by a lever arm 27 or other suitable means, the cams 22 will be turned thereby to press the member 20 inwardly, and through it, they will move the member 19 and rack bars 18 in the same direction. The rack bars will in turn rotate the gears 13 sufficiently to cause them to press the front tapered rollers 11 tightly between the bushings 8 and sleeves 10 to stop the rotation of the worms 5, 5 on their shafts 6, 6. After this has been done, the casing 3 will rotate the shaft 1, since the worms 5, 5 now act as an internal gear to rotate the gear 4 which is fast on said shaft. When pressure is again taken off the rollers 11, by rotating the shaft 21 in the reverse direction, the worms 5, 5 will be free to turn on their shafts 6, 6 without imparting a rotatory movement to the shaft 1 when they are revolved by the casing 3.

It will thus be seen that I have provided an efficient and easily-operated clutch mechanism that may be effectively employed for connecting any driving and driven members.

I do not wish to be limited to the details of construction and arrangement herein shown and described, and any changes or modifications may be made therein within the scope of the subjoined claims.

Having described my invention, I claim:

1. In a device of the type described, the combination with a driven member, of a driving member adapted to be revolved around the latter, in contact therewith, and a series of tapered rollers adapted to be forced inwardly for tight engagement with the periphery of the driving member to stop the rotation of the latter during its revoluble movement, for the purpose specified.

2. In a device of the type described, the combination with a driven member, of a driving member adapted to be revolved around the latter in contact therewith, a shaft on which said driving member loosely turns, a cupped end on said driving member, and tapered rollers adapted to be forced inwardly through peripheral recesses in said shaft, to engage each other and the interior surface of the cupped portion of the driving member, to stop the rotation of the latter during its revolution, for the purpose specified.

3. In a device of the type described, the combination with driving and driven members, of a gear on said driven member, a worm on the driving member, in mesh with the gear on the driven member, a shaft on which said worm loosely turns, a cupped end on said worm, and tapered rollers adapted to be forced inwardly between the interior surface of the cupped end of the worm and the shaft to prevent the rotation of said worm on the latter, for the purpose specified.

4. In a device of the type described, the combination with driving and driven members, of a gear on said driven member, a worm on the driving member, in mesh with the gear on the driven member, a shaft on which said worm loosely turns, a sleeve fixedly secured to said shaft, a cupped end of said worm, said sleeve projecting into the cupped portion of said worm, a bushing having an inwardly tapered inner surface, pressed into the cupped portion of said worm, the outer periphery of said sleeve being tapered to form between it and the inner wall of the bushing, an inwardly tapering annular space, and tapered rollers adapted to be forced into said annular space to engage each other and the surface of the sleeve and bushing, for the purpose specified.

5. In a device of the type described, the combination with a driven shaft, of a casing revoluble around the latter, a gear fast on said shaft within the casing, a second shaft having its ends fixedly secured within the casing, a worm loosely mounted on the second shaft, in mesh with the gear on the first shaft, a cupped end on said worm, a series of tapered rollers projecting endwise into the space between the second shaft and the cupped end of said worm, and means slidable along the second shaft adapted to engage the outer ends of said rollers to force them tightly between said second shaft and the cupped end of the worm, for the purpose specified.

6. In a device of the type described, the combination with a driven shaft, of a casing revoluble around the latter, a gear fast on said shaft, within the casing, a second shaft having its ends fixedly secured within the casing, a worm loosely mounted on the second shaft, in mesh with the gear on the first shaft, a cupped end on said worm, a series of tapered rollers projecting endwise into the space between the second shaft and the cupped end of said worm, and rotatable means longitudinally movable along the second shaft adapted to engage the outer ends of said rollers to force them tightly between said second shaft and the cupped end of said worm, for the purpose specified.

7. In a device of the type described, the combination with a driven shaft, of a casing revoluble around the latter, a gear fast on said shaft, within the casing, a second shaft having its ends fixedly secured within the casing, a worm loosely mounted on the second shaft, in mesh with the gear on the first shaft, a cupped end on said worm, a bushing in said cupped end of the worm, a sleeve on said second shaft, the inner surface of the bushing and the outer surface of the sleeve being tapered to form an inwardly tapering annular space, said sleeve having longitudinal concave recesses in its periphery, and tapered rollers adapted to be forced along said recesses, into the inwardly tapering space between the bushing and the sleeve, for the purpose specified.

8. In a device of the type described, the combination with a driven shaft, of a casing revoluble around the latter, a gear fast on said shaft, within the casing, a second shaft having its end fixedly secured within the casing, a worm loosely mounted on the second shaft, in mesh with the gear on the first shaft, a cupped end on said worm, a gear slidable along the second shaft, a ratchet face on said gear, a ratchet member secured to the second shaft in normal engagement with the ratchet face of the second gear, a series of tapered rollers projecting endwise into the space between the cupped end of said worm and the second shaft, and adapted to be engaged by the front face of the slidable gear, and means for rotating said slidable gear in a direction to be forced inwardly by said ratchet member to press the rollers tightly between the second shaft and the cupped end of said worm, for the purpose specified.

9. In a device of the type described, the combination with a driven shaft, of a casing revoluble around the latter, a gear fast on said shaft, within the casing, a second shaft having its ends fixedly secured within the casing, a worm loosely mounted on the second shaft, in mesh with the gear on the first shaft, a cupped end on said worm, a gear slidable along the second shaft, a ratchet face on said slidable gear, a ratchet member secured to the second shaft in normal engagement with the ratchet face on said slidable gear, a series of tapered rollers projecting endwise into the space between the cupped end of said worm and the second shaft, and adapted to be engaged by the front face of the slidable gear, a rack in engagement with said slidable gear, and cam means adapted to impart a longitudinal movement to said rack to rotate the slidable gear in a direction to be forced inwardly by said ratchet member, to press the rollers tightly between the second shaft and the cupped end of said worm, for the purpose specified.

10. In a device of the type described, the combination with a driven member, of a driving member adapted to be revolved around the latter, in contact therewith, and whose axis is at an angle to the axis of the driven member, and wedge means adapted to be given an end thrust for producing friction on the driving member for the purpose specified.

In testimony whereof I have hereunto set my hand this 22nd day of September, 1920.

WILLIAM J. KUHLS.

Witness:
HOWARD S. SMITH.